US012534989B2

(12) United States Patent
Khan et al.

(10) Patent No.: US 12,534,989 B2
(45) Date of Patent: Jan. 27, 2026

(54) METHOD TO REDUCE CARBON DIOXIDE RECOVERY FROM SUBSURFACE LOCATIONS

(71) Applicant: Schlumberger Technology Corporation, Sugar Land, TX (US)

(72) Inventors: Abdul Muqtadir Khan, Sugar Land, TX (US); Melissa Chia Mei Teoh, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/818,120

(22) Filed: Aug. 28, 2024

(65) Prior Publication Data

US 2025/0109671 A1 Apr. 3, 2025

Related U.S. Application Data

(60) Provisional application No. 63/586,704, filed on Sep. 29, 2023.

(51) Int. Cl.

| | |
|---|---|
| ***E21B 43/16*** | (2006.01) |
| ***C09K 8/594*** | (2006.01) |
| ***E21B 41/00*** | (2006.01) |
| ***E21B 43/26*** | (2006.01) |
| ***E21B 49/00*** | (2006.01) |

(52) U.S. Cl.

CPC ............ *E21B 43/164* (2013.01); *C09K 8/594* (2013.01); *E21B 41/0064* (2013.01); *E21B 43/26* (2013.01); *E21B 49/00* (2013.01)

(58) Field of Classification Search

CPC .... E21B 43/164; E21B 49/00; E21B 41/0064; E21B 43/16; E21B 2200/20; E21B 47/00

See application file for complete search history.

(56) References Cited

U.S. PATENT DOCUMENTS

| | | | | |
|---|---|---|---|---|
| 7,128,150 | B2 * | 10/2006 | Thomas | E21B 43/162 166/266 |
| 11,585,802 | B1 | 2/2023 | Qi | |
| 2010/0318337 | A1 | 12/2010 | Bailey | |
| 2014/0236549 | A1 | 8/2014 | Le Ravalec | |

(Continued)

FOREIGN PATENT DOCUMENTS

| | | | | |
|---|---|---|---|---|
| CA | 3001146 | A1 * | 8/2017 | E21B 41/0092 |
| EP | 4219889 | A1 | 8/2023 | |

(Continued)

OTHER PUBLICATIONS

Burnside, N.M. et al., "Review and implications of relative permeability of CO2/brine systems and residual trapping of CO2", International Journal of Greenhouse Gas Control, 2024, 23, pp. 1-11.

(Continued)

*Primary Examiner* — Zakiya W Bates

(74) *Attorney, Agent, or Firm* — Jeffrey D. Frantz

(57) ABSTRACT

The present disclosure provides for methods that may be used for effectively utilizing carbon dioxide in a plurality of hydrocarbon recovery operations in a plurality of wellbore types and configurations. A system may be used to increase or reduce residual carbon dioxide saturation within a wellbore and increase or reduce carbon dioxide recovery for wellbore applications.

22 Claims, 4 Drawing Sheets

(56) References Cited

U.S. PATENT DOCUMENTS

| | | | |
|---|---|---|---|
| 2014/0352984 | A1 | 12/2014 | Enis |
| 2015/0013977 | A1 | 1/2015 | Palmer |
| 2016/0040531 | A1 | 2/2016 | Ramakrishnan |
| 2016/0222774 | A1 | 8/2016 | Rhodes |
| 2016/0230062 | A1 | 8/2016 | Beuterbaugh |
| 2020/0284945 | A1 | 9/2020 | Khan |
| 2023/0266501 | A1 | 8/2023 | Vice |
| 2024/0141767 | A1 | 5/2024 | Wang |
| 2024/0392654 | A1 | 11/2024 | Beletskaya |
| 2025/0109664 | A1 | 4/2025 | Khan |
| 2025/0109665 | A1 | 4/2025 | Khan |

FOREIGN PATENT DOCUMENTS

| | | | | |
|---|---|---|---|---|
| WO | 2007076044 | A2 | 7/2007 | |
| WO | WO-2020037062 | A1 * | 2/2020 | ........... E21B 43/126 |
| WO | 2021188961 | A1 | 9/2021 | |
| WO | 2023092011 | A1 | 5/2023 | |
| WO | 2023177305 | A1 | 9/2023 | |

OTHER PUBLICATIONS

Bai, M. et al., “Relative Permeability Characteristics During Carbon Capture and Sequestration Process in Low-Permeable Reservoirs”, Materials, 2020, 13(4), pp. 1-15.

* cited by examiner

METHOD TO REDUCE CARBON DIOXIDE RECOVERY FROM SUBSURFACE LOCATIONS

CROSS-REFERENCE TO RELATED APPLICATIONS

The current application claims priority to U.S. Provisional Patent Application 63/586,704, filed Sep. 29, 2023, the entirety of which is incorporated by reference.

FIELD OF THE DISCLOSURE

Aspects of the disclosure relate to carbon dioxide use in hydrocarbon recovery operations. More specifically, aspects of the disclosure relate to use of a system to increase the residual carbon dioxide saturation and increase carbon dioxide recovery during hydrocarbon recovery operations.

BACKGROUND

Carbon capture utilization and storage, hereinafter "CCUS", involves aspects related to capturing, effective utilization, and storage of carbon dioxide. With the advent of administrative restrictions on the production of greenhouse gases, CCUS is taking more importance as a possible answer to the ever-increasing need for responsible environmental operations. Challenges exist; however, to effectively use carbon dioxide in meaningful ways to benefit society. The use of carbon dioxide has been traditionally hampered by the high costs of handling the gas in extensive tank fields at the surface. These extensive tank fields require large amounts of capital expenditure to create. Operating costs to cool the carbon dioxide to a level necessary for storage also technically and economically complicates society's potential to use carbon dioxide.

A typical conventional application of effective carbon capture and utilization is the use of carbon dioxide in enhanced oil recovery projects. In enhanced oil recovery projects, wellbores for hydrocarbon recovery are generally near the end of their oil recovery lifetimes. The objective for these mature wells is to enhance the hydrocarbon recovery through other methods, rather than pumping. This enhancement may use several methods, including but not limited to, thermal recovery methods, gas enhanced recovery projects, chemical enhanced recovery projects, hydrodynamic enhanced recovery projects, and combined enhanced recovery projects which may entail multiple of the types described above.

Of the above-described enhanced recovery projects, carbon dioxide usage is used in gas enhanced recovery projects. Storage of carbon dioxide is performed largely in shallow placements. More specifically, storage of carbon dioxide is generally performed in sandstone water aquifer formations. These sandstone water aquifer formations are generally shallow in depth. For example, the sandstone water aquifer formations are generally under 10,000 feet deep.

Storage is done mostly in shallow sandstone water aquifers. Conventionally, hydraulic fracturing used in the hydrocarbon recovery industry occurs when a geological stratum that holds hydrocarbons is forced to unlock trapped hydrocarbons by initiating cracks within the stratum. The cracks are initiated in several ways. One typical initiation method is to pump a fluid into a wellbore at pressure. Since the fluids are generally incompressible, the pumping of the fluid gradually builds in the subsurface until the pressure is so great that fissures occur in the stratum. Solid materials placed in the fluid, called proppants, are forced into the fissures. When the pressure is relieved from the wellbore, the proppants prevent the closure of the fissures. Through this, a pressure difference is created with the geological stratum, wherein the rock is generally under a higher pressure than the fissure. The pressure difference causes mobile hydrocarbon molecules to migrate to the low-pressure areas of the wellbore, where they are collected and pumped to the surface. Drawbacks are common in the above described methods for hydrocarbon recovery. In some instances, the chemicals used may be environmentally hazardous to groundwater systems. The use of chemicals themselves requires special handling. The chemicals are also expensive to manufacture and purchase and additionally may be licensed by local and state regulatory officials. Transport is also needed for such chemicals, further increasing costs.

It is known that small amounts of different materials and additives can be injected with water to initiate the cracks described above. In addition to proppants, different chemicals may be used create an acidic or basic environment, further enhancing fluid flow. It is also known that carbon dioxide may be added in small amounts to wellbore fluids.

There is a need to provide an apparatus and methods for initiating and/or stimulating a wellbore such that hydrocarbons may be recovered in an easy and environmentally safe manner.

There is a further need to provide apparatus and methods that do not have the drawbacks discussed above where large amounts of chemicals are used in fracturing and stimulation. The needs include, but are not limited to, use of more environmentally friendly alternatives that do not include the special handling for chemicals. The needs also include providing alternatives from a readily available source with the need for large transportation of chemicals to the wellbore site.

There is a still further need to reduce economic costs associated with operations and apparatus described above with conventional tools and methods. These needs may be reduction of trucking costs and special storage of chemicals. The needs also include providing a fracturing or stimulation system that may be added to existing wellsites to enhance wellbore recovery. Such systems added should be economically cost effective compared to chemical additive systems.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are; therefore, not to be considered limiting of its scope, for the disclosure may admit to other equally effective embodiments without specific recitation. Accordingly, the following summary provides just a few aspects of the description and should not be used to limit the described embodiments to a single concept.

In one example embodiment of the disclosure, a method of use of carbon dioxide at a wellbore is disclosed. The method may comprise installing a relative permeability modifier system at the wellbore, the system configured to produce a mixture to increase a residual carbon dioxide saturation level and increase a carbon dioxide recovery level of the wellbore. The method may further comprise conducting reservoir fluid testing with the mixture to test when a rheology performance of the mixture is acceptable for one of a fracturing, stimulation, and wellbore intervention activity. The method may further comprise formulating a final fluid mixture package based on the conducting of the rheology performance. The method may further comprise conducting tests of the final fluid mixture package for permeability for the wellbore to determine when the wellbore regains permeability. The method may further comprise executing a treatment of the wellbore with the final fluid mixture package. The method may further comprise monitoring and recording an amount of cumulative carbon dioxide recovery from the wellbore.

In a further example embodiment, a method of storing carbon dioxide at a wellbore is disclosed. The method may comprise installing a relative permeability modifier system at the wellbore, the system configured to produce a mixture to increase a residual carbon dioxide saturation level and increase a carbon dioxide recovery level of the wellbore. The method may further provide for formulating a final fluid mixture package based on at least one of testing of the final fluid mixture package with fluids from the wellbore and artificial intelligence selection of the final fluid mixture package. The method may further provide for executing a treatment of the wellbore with the final fluid mixture package.

In a further example embodiment, an article of manufacture is disclosed. The article of manufacture configured with a non-volatile memory, the non-volatile memory configured to be read by a computer and effectuate a modification of a physical system at a wellbore, a list of instructions encoded on the non-volatile memory to include a method of use of carbon dioxide at the wellbore, comprising: producing a mixture with a relative permeability modifier system at the wellbore, to increase a residual carbon dioxide saturation level and increase a carbon dioxide recovery level of the wellbore. The method may also comprise executing a treatment of the wellbore with the mixture. The method may also comprise at periodic intervals, pumping the relative permeability modifier system with the mixture during a production lifecycle of the wellbore. The method may also comprise monitoring and recording an amount of cumulative carbon dioxide recovery from the wellbore.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

Figure 1:
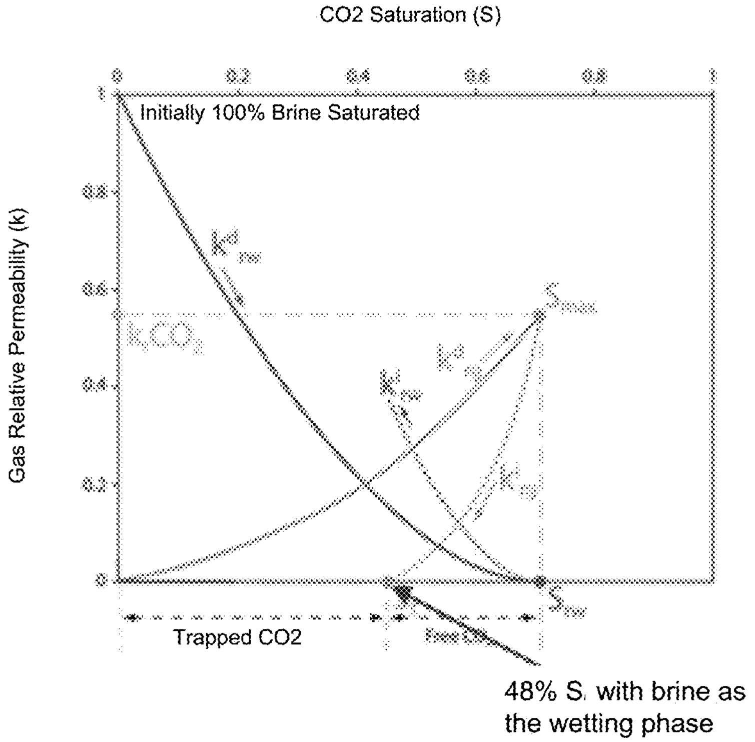
PRIOR ART FIG. 1
FIG. 1 is a drainage and imbibition curve for carbon dioxide levels.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second", and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

When an element or layer is referred to as being "on", "engaged to", "connected to", or "coupled to" another element or layer, it may be directly on, engaged, connected, or coupled to the other element or layer, or interleaving elements or layers may be present. In contrast, when an element is referred to as being "directly on", "directly engaged to", "directly connected to", or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure provide for a method to effectively use carbon dioxide in various wellbore applications. The type of each wellbore application may vary. A system may be installed on wellbores at any time in the wellbore lifecycle through the embodiments shown herein. The application of methods and apparatus near the end of a wellbore lifecycle may be particularly advantageous. In particular implementations, aspects of the disclosure provide an engineered method to extend the typical CCUS application spectrum. In aspects of the disclosure, a portion of fracturing, stimulation, or intervention fluids is replaced by carbon dioxide. In these aspects, techniques use carbon dioxide that is stored underground. The storage of this carbon dioxide may provide both quantification and qualification steps such that the overall application of the techniques produce acceptable results. In embodiments, the residual/hysteresis trapping property of carbon dioxide may be used to decarbonize wellsite operations and reduce the carbon dioxide recovered after a fracturing, stimulation, or intervention job.

Figure 2:
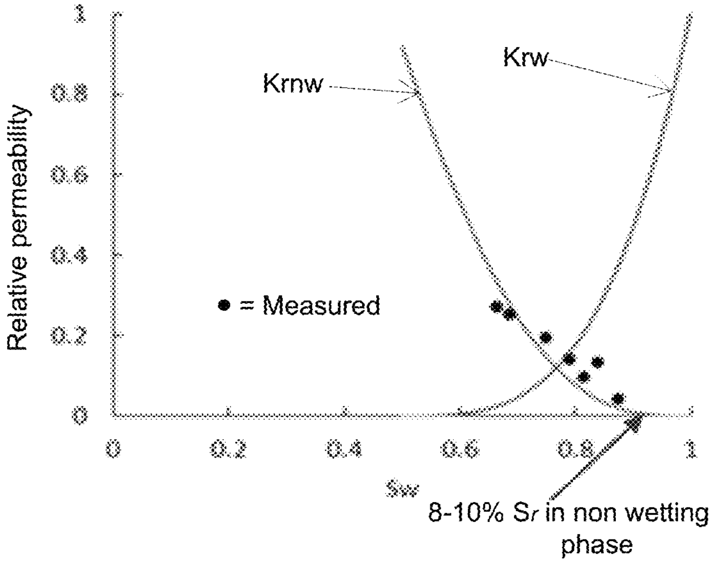
PRIOR ART FIG. 2
FIG. 2 is a drainage and imbibition curve for carbon dioxide levels.

Referring to FIGS. 1 and 2, plots are provided showing drainage and imbibition curves and residual saturation of carbon dioxide. With a flow rate of 0 in the plots, the saturation shown is a relative permeability of carbon dioxide. This implies that, that a fraction of carbon dioxide will be stored in the reservoir. FIG. 1 shows that this saturation could be as high as forty-eight (48) percent, but further evaluation indicates that the saturation may be as low as five (5) percent. This low value is supported in FIG. 2 where it is shown that the residual carbon dioxide is approximately eight (8) to ten (10) percent. Thus, there is considerable variability in the amount of carbon dioxide that may be stored in a given volume, as the imbibition curves indicate possible variability. There is still a need; however, to be able to store carbon dioxide in downhole locations and to beneficially utilize the gas instead of allowing the carbon dioxide to become a pollutant that encourages potential greenhouse warming of the environment.

Through testing, it has been found that the variation of carbon dioxide saturation exists and depends on the heterogeneity of the geologic stratum themselves that hold the overall volume of carbon dioxide. The stored/residual carbon dioxide varies as a function of porosity, pore throat radius, permeability, pore structure, existence of vugs and fractures, rock wetting phase, and fluid saturations before carbon dioxide is introduced, among other things.

Aspects of the disclosure further relate to increasing this value of stored/trapped carbon dioxide by shifting the drainage curve with the application of chemistry to modify relative permeability of carbon dioxide. To perform this shifting, relative permeability modifiers (RPM) may be used. Conventional apparatus do not use an RPM utilization approach with carbon dioxide assisted fracturing or intervention for the purpose of reducing carbon dioxide recovery post-treatment.

Figure 3:
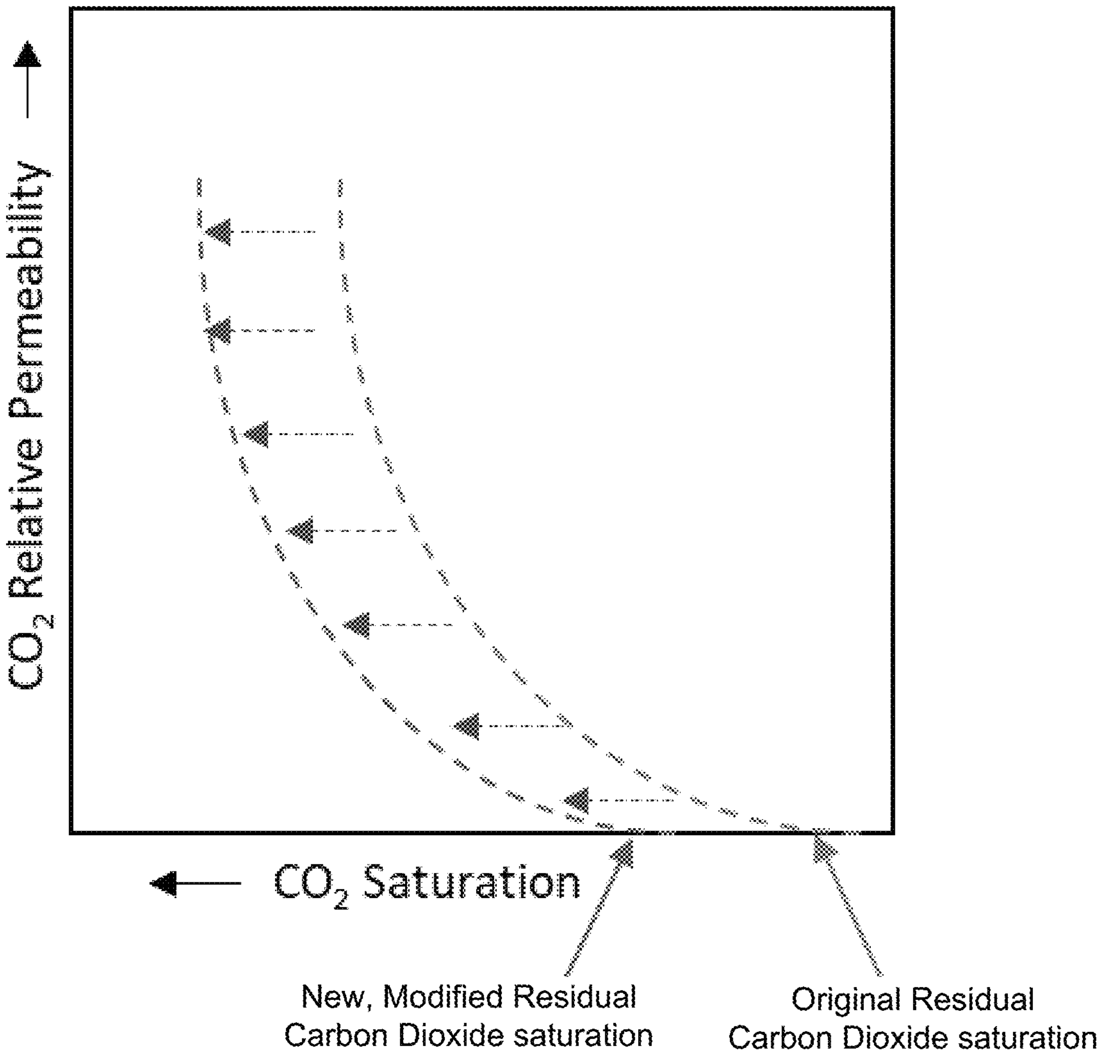
FIG. 3 is a graph of carbon dioxide saturation levels shifting through use of the methods described.

Referring to FIG. 3, one diagram for aspects of the disclosure is shown. In these aspects, residual carbon dioxide saturation shifts, reducing the recovery of carbon dioxide significantly and eventually storing more carbon dioxide pumped in fracturing, stimulation, and intervention treatments.

Aspects of the disclosure provide for various RPM additives that are compatible with reservoir fluids and with fracturing, stimulation, and intervention fluids. These additives do not degrade or negatively affect the quality of the base fluids. This additive can also be pumped at periodic intervals of the production lifecycle of the well to ensure the carbon dioxide is stored permanently.

Figure 4:
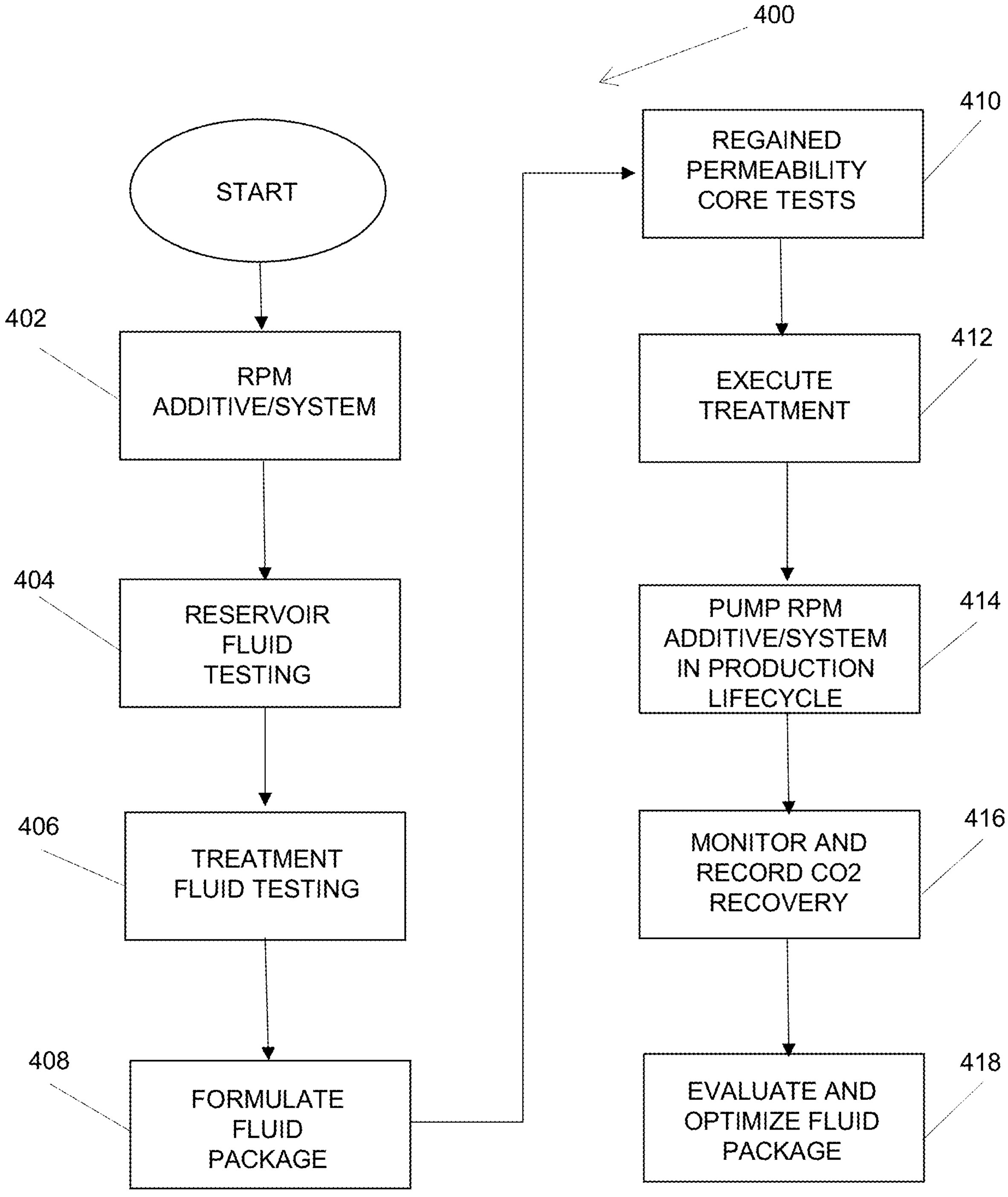
FIG. 4 is a method of using carbon dioxide in a hydrocarbon recovery operation in one example embodiment of the disclosure.

Referring to FIG. 4, an example embodiment of the disclosure is presented. Carbon neutrality or negativity may be achieved through embodiments of the disclosure. Modifications of existing technologies for wellbores may be used to achieve carbon neutrality or negativity for existing well technologies.

The method 400 may use a system that is innovated to increase the residual carbon dioxide saturation and increase carbon dioxide recovery at 402. The system may be retrofitted to existing wellbore technologies. The method continues at 404 with an optional step of reservoir fluid testing. In this step, the compatibility of reservoir fluids is tested to ensure that no undesirable products are formed. As will be understood, various chemical reactions may occur with carbon dioxide. At 404, therefore, testing occurs to ensure that production of such chemicals does not occur. As defined herein, reservoir fluids may include oil, gas condensate, and water among the chief components. Other possibilities exist and as such, the list should not be considered limiting. The method 400 continues at 406 with treatment fluid testing. At 406, the rheology performance of the treatment fluid is tested. The testing can be for, in non-limiting embodiments, hydraulic fracturing, wellbore stimulation and intervention fluids.

The method 400 continues at 408 with formulation of the fluid field package. As will be understood, each wellbore is different, therefore one specific fluid field package cannot be used for all wells. In embodiments herein, the formation of the fluid field package is specifically designed for each wellbore. The optimization of the fluid package is based on core tests to reduce carbon dioxide recovery.

After formulation of the fluid package, regained permeability core tests are performed at 410. This step conducts core tests with the RPM additive system to evaluate the regained permeability. If desired permeability is not achieved, a reformulation of any of the previous tests may occur. Recording of all of the data pertaining to each of the method steps may occur. Automation of the individual steps recited may occur through programming of a computer, connected to actuators at system components, to automatically perform the necessary actions. Artificial intelligence may be used to help fine tune selection processes for systems at each wellbore. After successful completion of wellbore activities, wellbore data retained at each step may be saved and used by artificial intelligence to train the artificial intelligence for future actions. Through such actions, the artificial intelligence becomes more accurate.

The method 400 continues at 412 with executing the treatment for the wellbore. At 414, optionally, the method 400 continues with pumping the RPM additive system periodically during the production lifecycle of the wellbore. From time to time, at 416, carbon dioxide within the wellbore is monitored and amounts of cumulative carbon dioxide recovery are determined. At 418, collected data during the method 400 may be used to further optimize the package. It will be understood that such optimization is not merely performed through data obtained during the method 400. Other discoveries may be used in performing optimization. Outside chemical tests or discoveries may be used by designers to fine tune the RMP additive system at 402. For example, at a different wellsite, it has been found that maintaining fluids within a specific viscosity range helps with the overall hydrocarbon recovery.

Through aspects of the disclosure, wellbore processes may achieve carbon neutrality and, in some embodiments, carbon negativity. The fairly common practice of hydraulic fracturing and stimulation can therefore provide for a significant reduction in the overall amount of greenhouse gases. Such an alteration of existing systems to achieve carbon neutrality or carbon negativity may be achieved by modifying the residual carbon dioxide saturation with a novel chemistry solution. The process includes conducting core tests, rheometer tests, and fluid compatibility tests to ensure that; (a) carbon dioxide recovery can be reduced efficiently; (b) the novel additive and the system it is mixed with are fully compatible with the reservoir fluids; (c) the novel additive is compatible with the fracturing, stimulation, or the intervention fluid system; and (d) the regained permeability does not reduce compared to the baseline. Compatibility entails that undesirable byproducts such as emulsions and sludges are not generated and there is no degradation of the fluid, by reducing its viscosity which could hamper results.

Once the testing and quality checks are conducted, treatment execution and monitoring of long-term measurements and calibrations can be put in place to ensure that there is a continuous improvement loop. Also, with more experimentation, execution, and post-treatment data accumulation, a database should be maintained for possible statistical and machine learning based optimizations for the future.

Applications of the methods described herein are numerous. Wellbores that are created on land or at sea may be potential candidates for the methods and systems described herein. The method 400 may also be used in conventional, tight gas/oil fields and wells. Further application may be extended to geothermal and unconventional formations. Different materials may be added to the overall final fluid package. These materials may include proppants, acids, foams, energized treatments, sand control systems, or water control systems, in non-limiting embodiments. Final fluid packages may be used in wellbore cleanout operations and plug milling/plug drill out operations. Final fluid packages may also be used in wellbore displacement operations and pump down during perforating activities. Other potential embodiments include use of the final fluid package with perforating with abrasive materials and other intervention techniques where pumping fluids downhole is required. Applications for use of the final fluid packages also include all conveyance types such as, coiled tubing, coiled tubing with fiber optics, wireline cable, wireline cable with fiber optics, and slickline.

Different types of wellbores may also use the methods and apparatus described herein. In embodiments, vertical, deviated, and horizontal wells may be treated with the methods, as well as, cased hole, open hole, open hole with fracturing sleeves, and isolation packers, and pre-perforated liners.

In embodiments, the optimization of fluid packages may be performed based upon use of synthetic datasets. In such embodiments, high quality data sets obtained from laboratory tests may be used to train artificial intelligence or predictive programs to enable quick selection of optimized solutions. In such embodiments, different features may be emphasized. For example, it may be desired to permanently store carbon dioxide within the wellbore; therefore, it is desired to reduce carbon dioxide recovery. In such embodiments, laboratory tests may be used to result in reduced carbon dioxide recovery. The embodiments will not be limited to reduced carbon dioxide recovery. In another such example, it may be desired to increase carbon dioxide draws from a wellbore. Such examples are possible where a beneficial use of carbon dioxide by industry is available. As carbon dioxide is used in many applications, it may be advantageous to use the captured carbon dioxide, thereby obviating the need to produce carbon dioxide through a manufacturing process.

In further embodiments, datasets of combined applications from both synthetic data and real-life testing may be used. In these embodiments, the data from different experimental tests such as core flows, compatibility, rheology tests, carbon dioxide imbibition, carbon dioxide drainage, regained permeability, treatment fluid compatibility, reservoir fluid compatibility, and rheology performance data that has been created synthetically may be mixed with field measurements. Predictive physics models that use artificial intelligence may be used. Types of geological stratum that may use the methods described include, but are not limited to, all clastic, carbonate, and non-metamorphic (e.g. volcanic rock) geologic sequences. As will be understood, in optimizing the fluid package at 418 in the method 400, actual field tests of the rock may be performed for chemical analysis. To enable this, core samples may be obtained from the downhole environment after treatment to identify permeability.

In other embodiments, the method 400 steps described above, may be performed through a computer system actuating different equipment connected to the computer. In embodiments, the method described can be coded into a set of instructions, readable by computer, to achieve results. To this end, a non-volatile memory may be used to store the set of instructions to be executed. Example embodiments; therefore, include methods performed by a computer or computer system. Such computers or computer systems may use artificial intelligence for aid in operations and selection of correct method steps. In embodiments, the set of instructions may be placed on a universal serial bus device, a computer hard drive, a solid-state memory system, an internet enabled computer, and/or a cloud computing device.

Example embodiments of the claims are described next. The embodiments disclosed should not be considered limiting. In one example embodiment of the disclosure, a method of use of carbon dioxide at a wellbore is disclosed. The method may comprise injecting a relative permeability modifier system at the wellbore, the system configured to produce a mixture to increase a residual carbon dioxide saturation level and increase a carbon dioxide recovery level of the wellbore. The method may further comprise conducting reservoir fluid testing with the mixture to ensure compatibility of the mixture with reservoir fluids. The method may further comprise conducting reservoir fluid testing with the mixture to test when a rheology performance of the mixture is acceptable for one of a fracturing, stimulation, and wellbore intervention activity. The method may further comprise formulating a final fluid mixture package based on the rheology performance. The method may further comprise conducting tests of the final fluid mixture package for permeability for the wellbore to determine when the wellbore regains permeability. The method may further comprise executing a treatment of the wellbore with the final fluid mixture package. The method may further comprise monitoring and recording an amount of cumulative carbon dioxide recovery from the wellbore.

In a further example embodiment, the method may be performed wherein the conducting of reservoir fluid testing with the mixture is performed to ensure no harmful environmental products are formed by the mixing of the mixture with the reservoir fluids.

In a further example embodiment, the method may be performed wherein the formulating the final fluid mixture package reduces carbon dioxide recovery from a wellbore.

In a further example embodiment, the method may further comprise recording data during the method.

In a further example embodiment, the method may further comprise analyzing the recorded data of the method and optimizing the final fluid mixture based on an analysis of the data.

In a further example embodiment, the method may further comprise modifying the relative permeability modifier system based on the optimized final fluid mixture.

In a further example embodiment, the method may be performed wherein the final fluid mixture package is effective in at least one of hydraulic fracturing, wellbore stimulation, and wellbore intervention.

In a further example embodiment, the method may be performed wherein the use of the carbon dioxide is storage of the carbon dioxide within the wellbore and surrounding geological stratum.

In a further example embodiment, the method may be performed wherein the treatment is a fracture of geological stratum surrounding the wellbore to enable a larger storage volume for carbon dioxide.

In a further example embodiment, a method of storing carbon dioxide at a wellbore is disclosed. The method may comprise installing a relative permeability modifier system at the wellbore, the system configured to produce a mixture to increase a residual carbon dioxide saturation level and increase a carbon dioxide recovery level of the wellbore. The method may further provide for formulating a final fluid mixture package based on at least one of testing of the final fluid mixture package with fluids from the wellbore and artificial intelligence selection of the final fluid mixture package. The method may further provide for executing a treatment of the wellbore with the final fluid mixture package.

In a further example embodiment, the method may further comprise at periodic intervals, pumping the relative permeability modifier system with the final fluid mixture during a production lifecycle of the wellbore. The method may further comprise monitoring and recording an amount of cumulative carbon dioxide recovery from the wellbore.

In a further example embodiment, the method may further comprise recording data related to downhole conditions after the executing of the treatment of the wellbore with the final fluid mixture package.

In a further example embodiment, the method may be performed wherein the data recorded relating to the downhole conditions comprises at least one of a temperature, a pressure, and carbon dioxide saturation levels.

In a further example embodiment, the method may be performed wherein the executing of the treatment of the wellbore includes at least one of clastic, carbonate, and non-metamorphic geologic sequences.

In a further example embodiment, the method may further comprise obtaining a core sample of a geological stratum near the wellbore and chemically testing the obtained core sample.

In a further example embodiment, the method may be performed wherein the chemical testing includes determining a carbon dioxide permeability of the core sample.

In a further example embodiment, an article of manufacture is disclosed. The article of manufacture configured with a non-volatile memory, the non-volatile memory configured to be read by a computer and effectuate a modification of a physical system at a wellbore, a list of instructions encoded on the non-volatile memory to include a method of use of carbon dioxide at the wellbore, comprising: producing a mixture with a relative permeability modifier system at the wellbore, to increase a residual carbon dioxide saturation level and increase a carbon dioxide recovery level of the wellbore. The method may also comprise executing a treatment of the wellbore with the mixture. The method may also comprise at periodic intervals, pumping the relative permeability modifier system with the mixture during a production lifecycle of the wellbore. The method may also comprise monitoring and recording an amount of cumulative carbon dioxide recovery from the wellbore.

In a further example embodiment, the article of manufacture may be configured wherein the article is in a form of one of a universal serial bus service, a compact disk, a computer hard disk, and a solid-state disk.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of use of carbon dioxide at a wellbore, comprising:

injecting a relative permeability modifier system at the wellbore, the system configured to produce a mixture to increase a residual carbon dioxide saturation level and modify a carbon dioxide recovery level of the wellbore;

conducting reservoir fluid compatibility and fluid rheology testing with the mixture to test when a rheology performance of the mixture is acceptable for one of a fracturing, stimulation, and wellbore intervention activity;

formulating a final fluid mixture package based on the conducting of the rheology performance;

conducting tests of the final fluid mixture package for permeability for the wellbore to determine when the wellbore regains permeability;

executing a treatment of the wellbore with the final fluid mixture package; and monitoring and recording an amount of cumulative carbon dioxide recovery from the wellbore.

2. The method according to claim 1, wherein the conducting of reservoir fluid testing with the mixture is performed to ensure no harmful environmental products are formed by the mixing of the mixture with the reservoir fluids.

3. The method according to claim 1, wherein the formulating the final fluid mixture package reduces carbon dioxide recovery from the wellbore.

4. The method according to claim 1, further comprising: recording data during the method.

5. The method according to claim 4, further comprising: analyzing the recorded data of the method; and optimizing the final fluid mixture based on an analysis of the data.

6. The method according to claim 5, further comprising: modifying the relative permeability modifier system based on the optimized final fluid mixture.

7. The method according to claim 1, wherein the final fluid mixture package is effective in at least one of hydraulic fracturing, wellbore stimulation, and wellbore intervention.

8. The method according to claim 1, wherein the use of the carbon dioxide is storage of the carbon dioxide within the wellbore and surrounding geological stratum.

9. The method according to claim 1, wherein the treatment is a fracture of geological stratum surrounding the wellbore to enable a larger storage volume for carbon dioxide.

10. The method according to claim 1, further comprising conducting reservoir fluid testing with the mixture to ensure compatibility of the mixture with reservoir fluids after the injecting of the relative permeability modifier system.

11. The method according to claim 1, further comprising at periodic intervals, pumping the relative permeability modifier system with the final fluid mixture during a production lifecycle of the wellbore after the executing the treatment.

12. The method according to claim 1, wherein the relative permeability modifier system reduces the carbon dioxide recovery level of the wellbore.

13. The method according to claim 1, wherein the relative permeability modifier system increases the carbon dioxide recovery level of the wellbore.

14. A method of storing carbon dioxide at a wellbore, comprising:

installing a relative permeability modifier system at the wellbore, the system configured to produce a mixture to increase a residual carbon dioxide saturation level and increase a carbon dioxide recovery level of the wellbore;

formulating a final fluid mixture package based on at least one of testing of the final fluid mixture package with fluids from the wellbore and artificial intelligence selection of the final fluid mixture package; and executing a treatment of the wellbore with the final fluid mixture package.

15. The method according to claim 14, further comprising:

at periodic intervals, pumping the relative permeability modifier system with the final fluid mixture during a production lifecycle of the wellbore; and monitoring and recording an amount of cumulative carbon dioxide recovery from the wellbore.

16. The method according to claim 15, further comprising:

recording data related to downhole conditions after the executing of the treatment of the wellbore with the final fluid mixture package.

17. The method according to claim 16, wherein the data recorded relating to the downhole conditions comprises at least one of a temperature, a pressure and carbon dioxide saturation levels.

18. The method according to claim 16, wherein the executing of the treatment of the wellbore includes at least one of clastic, carbonate, and non-metamorphic geologic sequences.

19. The method according to claim 16, further comprising:

obtaining a core sample of a geological stratum near the wellbore; and chemically testing the obtained core sample.

20. The method according to claim 19, wherein the chemical testing includes determining a carbon dioxide permeability of the core sample.

21. A method of use of carbon dioxide at a wellbore, comprising:

injecting a relative permeability modifier system at the wellbore, the system configured to produce a mixture to increase a residual carbon dioxide saturation level and reduce a carbon dioxide recovery level of the wellbore;

conducting reservoir fluid compatibility with the mixture to test there is no incompatibility with the fluid involved in an enhanced oil recovery process;

formulating a final fluid mixture package based on the conducting of the testing;

executing a treatment of the wellbore with the final fluid mixture package; and monitoring and recording an amount of cumulative carbon dioxide recovery from the wellbore.

22. The method according to claim 21, further comprising repeating the treatment periodically during the lifecycle of the enhanced oil recovery project.

* * * * *